Dec. 23, 1924.

O. SCHLAUPITZ

INDICATING GAUGE

Filed June 4, 1923

1,520,263

Inventor:
Oswald Schlaupitz,
by Carrett Cameron,
his Attorneys.

Patented Dec. 23, 1924.

1,520,263

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

INDICATING GAUGE.

Application filed June 4, 1923. Serial No. 643,331.

*To all whom it may concern:*

Be it known that I, OSWALD SCHLAUPITZ, a citizen of the United States, and a resident of the city of Canton, in the county of Stark and State of Ohio, have invented a new and useful Improvement in Indicating Gauges, of which the following is a specification.

This invention relates to indicating gauges and has for its principal objects to produce a strong, durable and compact gauge that will accurately determine the measurements of exterior sizes. Other objects are to simplify the gaging operation, to simplify the construction of the gauge, to reduce the cost thereof, and to obtain other advantages. The invention consists in the combinations and arrangements of parts hereinafter described and claimed.

Figure 1:
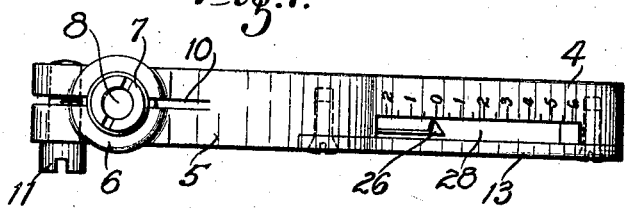

In the accompanying drawing, which forms part of this specification and wherein like symbols refer to like parts wherever they occur, Fig. 1 is a plan view of an indicating guage embodying my invention.

Figure 2:
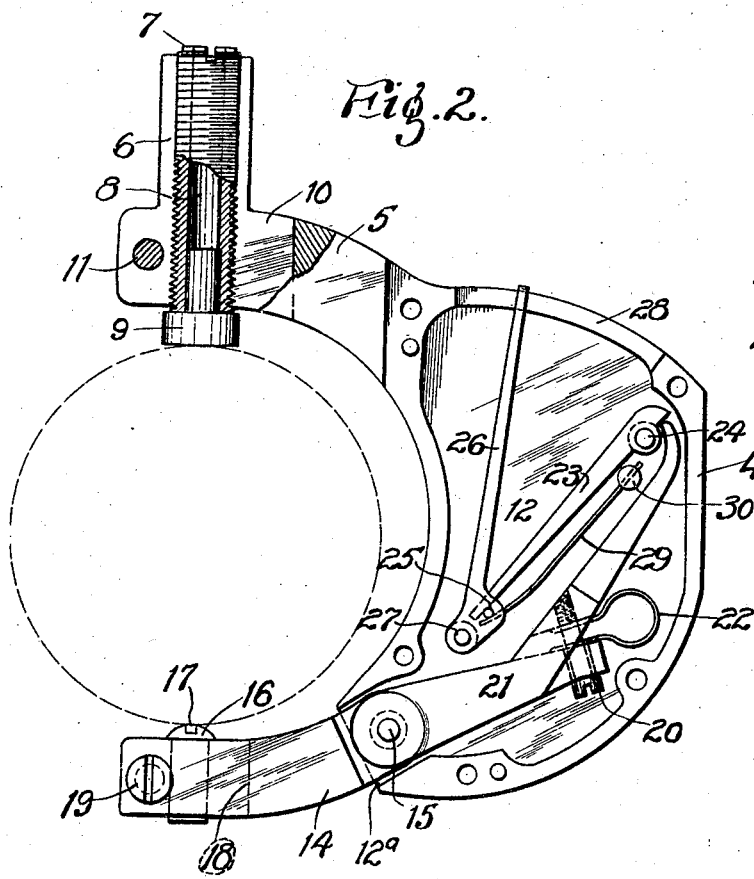
Figure 3:
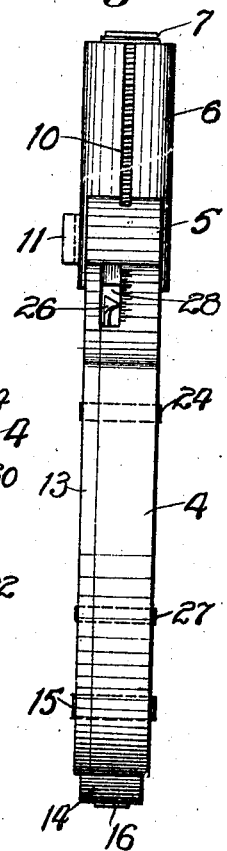

Fig. 2 is a side elevation of said gauge with the cover plate removed and the gauge in position to gauge a cylindrical article; and Fig. 3 is a rear end elevation of a gauge.

The device comprises a flat body or handle portion 4, which is provided at its upper front corner with a horizontally projecting arm 5. The arm 5 of the casing 4 is provided adjacent to its outer end with an upstanding cylindrical boss 6 provided with an axial bore adapted to receive an adjusting screw 7. The screw-receiving bore extends from the upper end of the boss 6 to the lower side of the arm 5 and has its lower end portion threaded for cooperation with the adjusting screw 7. This adjusting screw 7 is provided with a central bore 8, which extends from end to end of the screw and is adapted to receive, in its lower end, the cylindrical shank portion of a headed contact member 9. The shank portion of the contact member 9 has a press fit in the bore in the adjusting screw 7; and the head or anvil portion of said 7; and the contact member is hardened and its lower contact surface accurately ground flat at right angles to the longitudinal axis of the adjusting screw 7. The forward end portion of the arm 5, together with the cylindrical boss 6, is split vertically, as at 10; and a clamping screw 11 extends horizontally through one of the split portions of the arm and is threaded into the other split portion thereof, whereby the adjusting screw may be locked in any desired adjusted position.

The casing 4 is provided at one side with a recess 12, which is closed by means of a removable cover plate 13. The lower front end of the casing is provided with an opening 12ª, which opens into the recess 12 and is of a size sufficient to accommodate a contact lever 14 and permit slight swinging movement thereof. The contact lever 14 is provided between its ends with a horizontal spindle 15. This spindle has a press fit in the contact lever; and the projecting end portions of said spindle are journaled in axially alined horizontal bearings in the casing 4 and cover plate 13. The contact lever 14 is disposed in the same vertical plane with the forwardly projecting arm 5 of the casing 4 and is provided adjacent to the outer end of its forwardly projecting arm with a bore adapted to be brought into substantially axial alinement with the adjusting screw 7 in the set position of the gauge.

A contact member 16 has a cylindrical shank portion, which is fitted in the bore in the forward arm of the contact lever, and an enlarged rounded head portion that has a fragment of a diamond 17 or other hard substance set centrally therein. The forward end portion of the contact lever is split vertically, as at 18, and the split portions are drawn together about the shank portion of the contact member 16 by means of a clamping screw 19, thereby firmly clamping said contact member in position.

The inner arm of the contact lever 14 extends into the recess 12 in the casing 4 and is provided at its free end with a hole adapted to receive a screw 20, which has a loose fit therein. A bent arm 21 has a forked forward end portion that straddles the inner arm of the contact lever 14 and is provided with axially alined horizontal holes adapted to receive the spindle or fulcrum pin 15 of said contact lever, whereby said arm 21 is adapted for vertical swinging movement about the contact lever spindle 15 as a center.

Interposed between the solid portion of the arm 21 and the adjacent free end portion of the inner arm of the contact lever 14 are the two branches of a U-shaped spring 22. The two branches of the spring 22 bear against the opposing surfaces of the contact lever 14 and the pivoted arm 21 supported thereon and thus tend to force them apart. The screw 20, which has a loose fit in the bore in the end of the inner arm of the contact lever 14, extends through alined holes in the two branches of the spring 22 and is threaded into the upwardly inclined end portion of the arm 21. This arrangement permits slight independent swinging movement of the arm 21 with relation to the contact lever 14, the length of such movement being regulated by manipulation of the adjusting screw 20.

The free upper end of the yieldable arm 21 bears against the short arm of a multiplying lever 23, which is journaled on a horizontal pin 24 whose ends have a press fit in alined holes provided therefor in the casing 4 and cover plate 13. The long arm of the multiplying lever 23 extends downwardly and forwardly at an inclination and bears on top of a pin 25 that projects horizontally from one side of a pointer 26 adjacent to the hub portion thereof. The pointer 26 is provided with oppositely extending horizontal trunnions 27 journaled in axially alined horizontal holes in the casing 4 and cover plate 13. The pin 25 carried by the pointer 26 is located adjacent to the pivotal axis of said pointer and is offset rearwardly and upwardly with respect to said axis. The upper end of the pointer moves through a slot 28 in the top wall of the casing 4, said wall being curved in an arc described about the pivotal axis of the pointer as a center. The exterior surface of the arcuate top portion of the casing 4 is graduated on one side of its slotted portion to give readings in .001 of an inch.

Mounted immediately beneath the multiplying lever 23 is a flat spring 29, one end of which is securely anchored to the casing by means of a pin 30. The free end of the spring 29 bears against the underside of the pin 25 on the pointer 26 and thus normally tends to swing the pointer against the forward end of the slot 28 and the forward arm of the contact lever 14 in the direction of the adjustable contact member 9.

In setting the gauge, a master block or cylinder of the desired size is placed between the contact members 9 and 16 and the adjusting screw 7 manipulated to bring the pointer 26 into register with the zero mark on the scale. The adjusting screw 7 is then clamped in place by means of the clamping screw 11 and the master form is then removed, leaving the operating parts of the gauge in correct adjustment for gaging articles patterned after the master form used in setting the gauge.

The gauge is used as follows: The gauge is disposed with the arm 5 and the outer arm of the contact lever 14 astraddle the article or member that is to be inspected and with the anvil or head of the contact member 9 and the diamond on the contact member 16 in contact with the work at diametrically opposite points. This action causes the inner arm of the contact lever 14 to swing upwardly and press the free end of the arm 21 supported thereon against the short arm of the multiplying lever 25 and thus cause the long arm thereof to swing downwardly against the pressure of the spring 29 and press against the pin 25 on the pointer 26. This pressure causes said pointer or indicator arm 26 to swing rearwardly in the direction of the zero mark on the segment scale a distance depending on the size of the member being gaged. In the event that the pointer comes to rest opposite the zero mark, the piece being gaged is of the desired size; that is, the size corresponding to the size of the master piece. If the pointer comes to rest to the right of the zero mark, the size of the piece being gaged is shown to be too large and should be rejected as being oversize. If the pointer moves to the left of the zero mark, the size of the article is shown to be too small and should be rejected as being undersize.

Among the advantages of my indicating gauge are the following: It can be built to cover any desired range and can be used for any size falling within the range selected; it can be used for gaging the exterior diameter of the work while rotating in the lathe or other machine, thereby eliminating loss of time in the stopping of the machine to caliper the work; and it will give a true diametrical reading, by reason of the tendency for the large, flat anvil or head of the upper contact member 9 to seek a position at right angles to the axis of the work and thus cause the diamond point to contact with the work at a point diametrically opposite to the line of contact between said anvil and said work. Another important advantage of my invention is that, in the event that an attempt is made to gauge an article of a size greater than the chosen maximum measuring limit of the gauge, the spring 22 serves as a safety device for preventing damage to the gauge; for a continued upward movement of the inner arm of the contact lever 14 after the pointer 26 has reached the limit of its forward movement forces the spring 22 to yield and thus prevent bending or breaking of the parts forming the indicating mechanism of the gauge.

It is obvious that numerous changes may be made without departing from my invention and I do not wish to be limited to the precise construction shown.

What I claim is:

1. A gauge comprising a contact member, a movable contact member between which and said first-mentioned contact member is received the member to be gaged, a pointer arranged for limited swinging movement, and means for transmitting motion from said movable contact member to said pointer, said means permitting movement of said movable contact member away from said first-mentioned contact member after said pointer has reached the limit of its swinging movement.

2. A gauge comprising a contact member, a movable contact member between which and said first-mentioned contact member is received the member to be gaged, a pointer arranged for limited swinging movement, means for transmitting motion from said movable contact member to said pointer, said means permitting further movement of said movable contact member away from said first-mentioned contact member after said pointer has reached the limit of its swinging movement, and means for varying the length of such further movement of said movable contact member.

3. A gauge comprising an adjustable contact member, a pivoted contact member arranged for swinging movement towards and away from said adjustable contact member and between which and the latter is received the member to be gaged, a pointer pivotally mounted, and means for transmitting motion from said pivoted contact member to said pointer, said means permitting a continued movement of said pivoted contact member away from said adjustable contact member after said pointer has reached the limit of its movement in the direction indicating the maximum measuring limit of said gauge.

4. A gauge comprising a contact member, a pivoted contact member arranged for swinging movement towards and away from said first-mentioned contact and between which and the latter is received the member to be gaged, an indicating mechanism operatively connected with said movable contact member to be actuated thereby, and means for permitting independent swinging movement of said pivoted contact member relative to said indicating mechanism after said mechanism has reached the limit of its movement in the direction indicating the maximum measuring limit of the gauge.

5. A gauge comprising a contact member, a movable contact member between which and said first-mentioned contact member is received the member to be gaged, an indicating mechanism operatively connected with said movable contact member to be actuated thereby, means for permitting independent movement of said movable contact member relative to said indicating mechanism after said mechanism has reached the limit of its movement in the direction indicating the maximum measuring limit of the gauge, and means for varying the length of such independent movement.

6. A gauge comprising a casing having a stationary contact member adapted to engage one side of the article to be gaged, a contact lever pivoted in said casing in a position to engage the opposite side of said member, a pointer, a multiplying system for transmitting motion from said contact lever to said pointer and a connection between said lever and said multiplying system. said connection permitting movement of said contact lever after said pointer has reached the limit of its movement.

7. A gauge comprising a casing having a stationary contact member adapted to engage one side of the article to be gaged, a contact lever pivoted in said casing in a position to engage the opposite side of said member, a pointer, a multiplying system for transmitting motion from said contact lever to said pointer, and a connection between said lever and said multiplying system, said connection permitting movement of said contact lever after said pointer has reached the limit of its movement, said connection being adjustable whereby the length of such movement of said contact lever may be varied.

8. A gauge comprising a casing, a contact member, a contact lever pivoted in said casing and between which and said contact lever is received the member to be gaged, a pointer, an arm pivoted in said casing for swinging movement about the fulcrum of the contact lever as a center, a multiplying lever pivoted in said casing and cooperating at one end with said pointer and at the opposite end with the end of said arm, and a yieldable connection between said arm and said contact lever, said connection permitting relative movement between said contact lever and said arm after said pointer has reached the limit of its movement in the direction indicating the maximum measuring limit of said gauge.

9. A gauge comprising a casing, an adjustable contact member, a contact lever pivoted in said casing and between which and said adjustable contact member is received the member to be gaged, an arm pivoted in said casing for swinging movement about the pivotal axis of said contact lever as a center, a multiplying lever between said casing and contacting at one end with said pointer adjacent to the pivotal axis thereof and at its other end with the end of said arm, a spring for holding said multiplying lever in engagement with said pointer and said arm, and a spring connection between said contact lever and said arm, said connection permitting independent movement of said contact lever relative to said arm after said pointer has reached the limit of its movement in the direction indicating the maximum measuring limit of the gauge.

Signed at Canton, Ohio, this 31st day of May, 1923.

OSWALD SCHLAUPITZ.